(12) United States Patent
Fan (10) Patent No.: US 9,152,189 B2
(45) Date of Patent: Oct. 6, 2015

(54) LOCKING MECHANISM AND REMOVABLE ELECTRONIC DEVICE USING SAME

(75) Inventor: Chih-Hsiang Fan, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 1142 days.

(21) Appl. No.: 13/159,369

(22) Filed: Jun. 13, 2011

(65) Prior Publication Data

US 2012/0213577 A1 Aug. 23, 2012

(30) Foreign Application Priority Data

Feb. 23, 2011 (TW) .............................. 100203232 U (51) Int. Cl.
*G06F 1/18* (2006.01)
*G11B 33/12* (2006.01)

(52) U.S. Cl.
CPC .............. *G06F 1/187* (2013.01); *G11B 33/124* (2013.01); *Y10T 403/602* (2015.01)

(58) Field of Classification Search
CPC ........... E05C 3/00; E05C 3/002; E05C 3/004; E05C 3/12; E05C 3/122; E05C 3/124; E05C 9/00; E05C 9/008; E05C 9/04; E05C 9/042; E05C 9/14
USPC ........... 292/3–6, 8, 11, 24, 25, 27, 32, 33, 37, 292/42, 44, 45, 49, 54, 57, 58, 62–65, 67, 292/69, DIG. 11, DIG. 63, 229, 34, 46; 361/679.4, 679.39, 679.58, 725, 726; 206/710, 711
See application file for complete search history.

(56) References Cited

U.S. PATENT DOCUMENTS

| | | | | | |
|---|---|---|---|---|---|
| 203,360 | A | * | 5/1878 | Moffett | 292/7 |
| 1,020,454 | A | * | 3/1912 | Seidenbecker | 292/37 |
| 1,104,604 | A | * | 7/1914 | Arndt | 292/5 |
| 1,184,793 | A | * | 5/1916 | Unckrich | 292/5 |
| 1,643,365 | A | * | 9/1927 | Bell | 292/37 |
| 1,794,171 | A | * | 2/1931 | Grutel | 292/45 |
| 2,664,611 | A | * | 1/1954 | Shomber | 24/635 |
| 3,362,740 | A | * | 1/1968 | Burns | 292/34 |
| 3,884,515 | A | * | 5/1975 | Ashkenazi | 292/34 |
| 4,362,034 | A | * | 12/1982 | Amgar | 70/108 |
| 4,690,439 | A | * | 9/1987 | Park | 292/27 |
| 4,973,091 | A | * | 11/1990 | Paulson et al. | 292/51 |
| 5,957,292 | A | * | 9/1999 | Mikkelsen et al. | 206/710 |
| 6,105,782 | A | * | 8/2000 | Fujimori et al. | 206/710 |
| 6,351,379 | B1 | * | 2/2002 | Cheng | 361/679.33 |
| 6,956,745 | B2 | * | 10/2005 | Kerrigan et al. | 361/726 |
| 7,455,181 | B2 | * | 11/2008 | Matsutori et al. | 206/710 |
| 8,077,467 | B2 | * | 12/2011 | Chen et al. | 361/726 |
| 8,177,264 | B2 | * | 5/2012 | Iwakami | 292/36 |
| 8,416,563 | B2 | * | 4/2013 | Hou | 361/679.33 |

(Continued)

*Primary Examiner* — Alyson M Merlino
(74) *Attorney, Agent, or Firm* — Novak Druce Connolly Bove + Quigg LLP (57) ABSTRACT

A locking mechanism is used to lock a removable electronic device on a housing structure including a pair of resisting portions. The locking mechanism includes a pair of bar members, a pair of elastic elements and an operating member. Each of the pair of bar members includes a blocking portion to engage with the corresponding resisting portion and a matching portion. The pair of elastic elements is elastically connected between the electronic device and the corresponding bar members. The operating member located between the pair of bar members and defines a first groove and a second groove respectively engaging with the matching portions.

19 Claims, 9 Drawing Sheets

(56) References Cited

U.S. PATENT DOCUMENTS

| | | | | |
|---|---|---|---|---|
| 8,605,440 | B2* | 12/2013 | Gong et al. | 361/726 |
| 2005/0199529 | A1* | 9/2005 | Matsutori | 206/710 |
| 2010/0032339 | A1* | 2/2010 | Hasegawa et al. | 206/710 |
| 2011/0266192 | A1* | 11/2011 | Chiu et al. | 206/711 |
| 2011/0309639 | A1* | 12/2011 | Chen et al. | 292/140 |

\* cited by examiner

LOCKING MECHANISM AND REMOVABLE ELECTRONIC DEVICE USING SAME

BACKGROUND

1. Technical Field

The present disclosure relates to a removable electronic device, and more particularly to a locking mechanism for the removable electronic device.

2. Description of Related Art

Currently, many electronic devices, such as removable power supplies, removable hard disks and removable fans, have been widely used in computers, servers, redundant arrays of inexpensive disks (RAID), and communication devices. The electronic devices can supply enough and continual electric power or enough and manageable data storage space, and provide convenience for users to take out or exchange power supply, hard disk and fan.

Taking the power supply as illustration, in order to take out or exchange the power supply conveniently, users commonly like to mount a handle on an outer mechanism of the power supply to apply a force on the handle. However, the power supply easily disengages from a rack mount to be damaged when it is transported or placed in a wrong direction.

Therefore, a need exists in the industry to overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
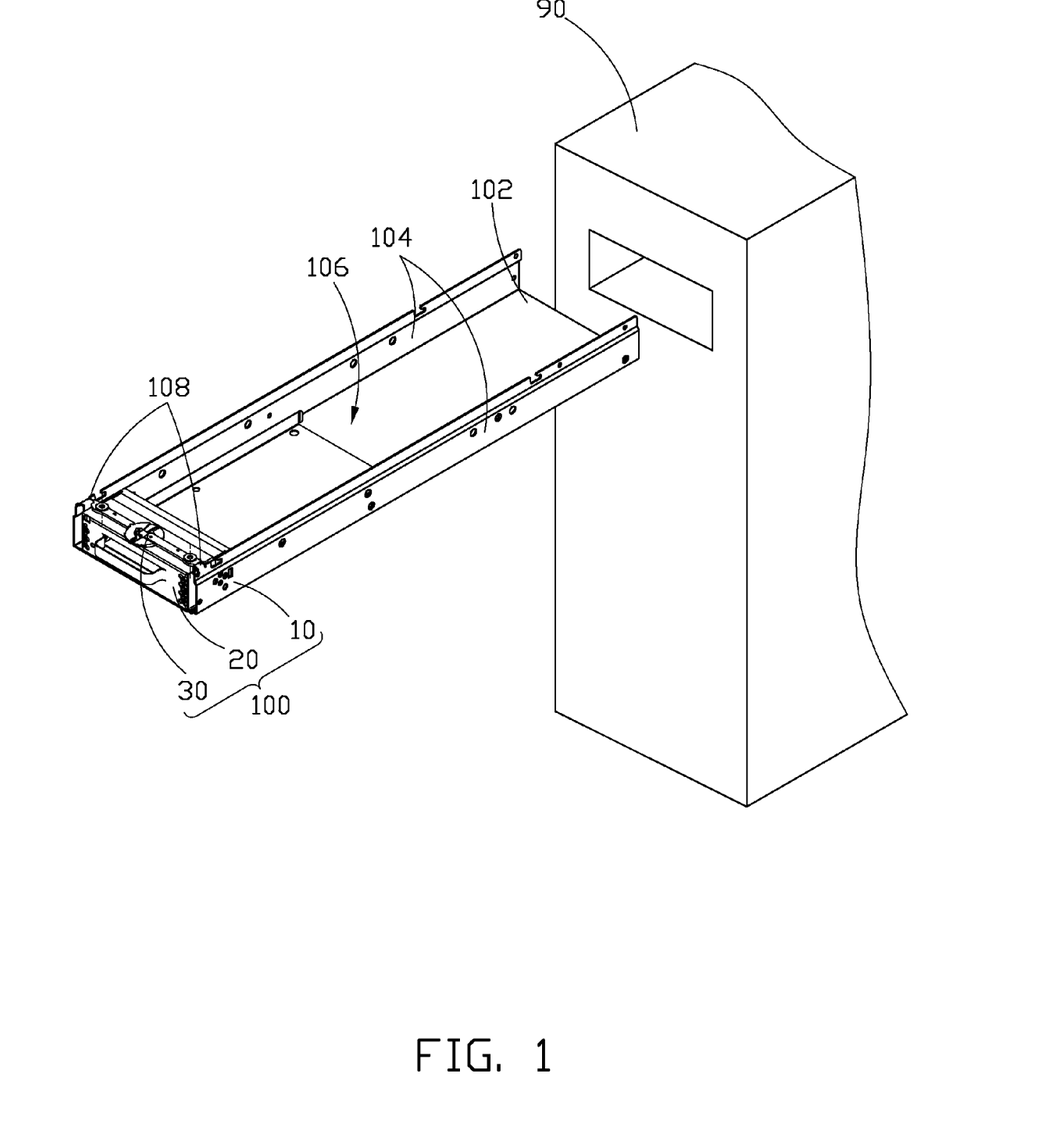
FIG. 1 is an exploded perspective view of one exemplary embodiment of an electronic assembly and a rack mount in accordance with the present disclosure.

Referring to FIG. 1, an electronic assembly 100 comprises a housing structure 10, a removable electronic device 20 and a locking mechanism 30. The locking mechanism 30 is used to lock the electronic device 20 in the housing structure 10. As will be described in further detail below, the electronic device 20 and the locking mechanism 30 can be mounted in a rack mount 90 by means of the housing structure 10. In the embodiment, the electronic device 20 may be but not limit to a removable hard disk, a removable power supply, or a removable fan.

The housing structure 10 comprises a bottom wall 102 and a pair of side walls 104 perpendicularly extending from two opposite sides of the bottom wall 102. The bottom wall 102 and the pair of side walls 104 collectively define a receiving space 106 to receive the electronic device 20. The housing structure 10 further comprises a pair of resisting portions 108 respectively extending from the two side walls 104 towards the receiving space 106. The pair of resisting portions 108 resists the locking mechanism 30 to securely fix the electronic device 20 onto the housing structure 10. In the illustrated embodiment, the pair of resisting portions 108 is integrally formed with the corresponding side walls 104.

Figure 2:
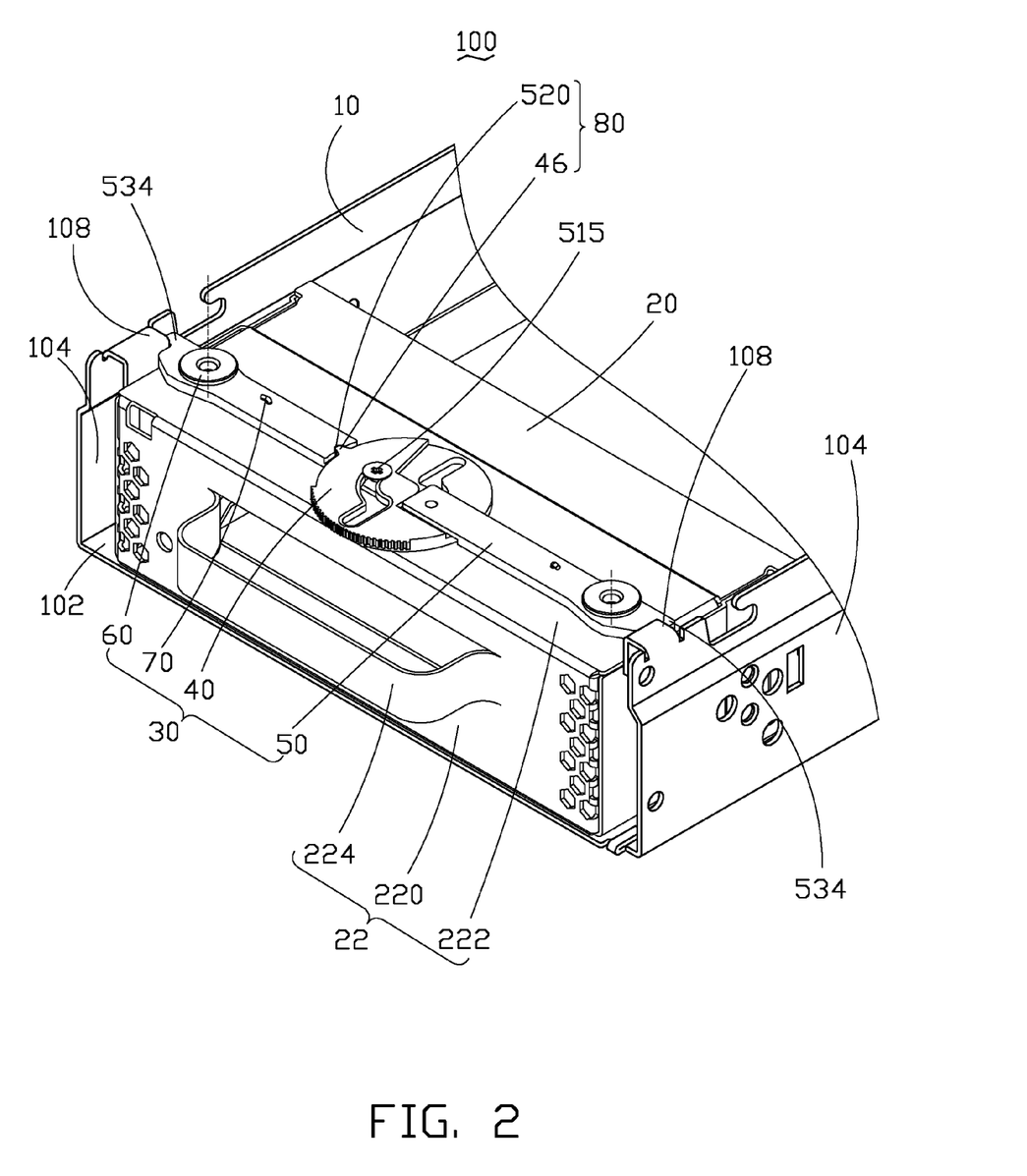
FIG. 2 is a perspective view of the exemplary embodiment of the electronic assembly when a removable electronic device in a locking state in accordance with the present disclosure.
Figure 3:
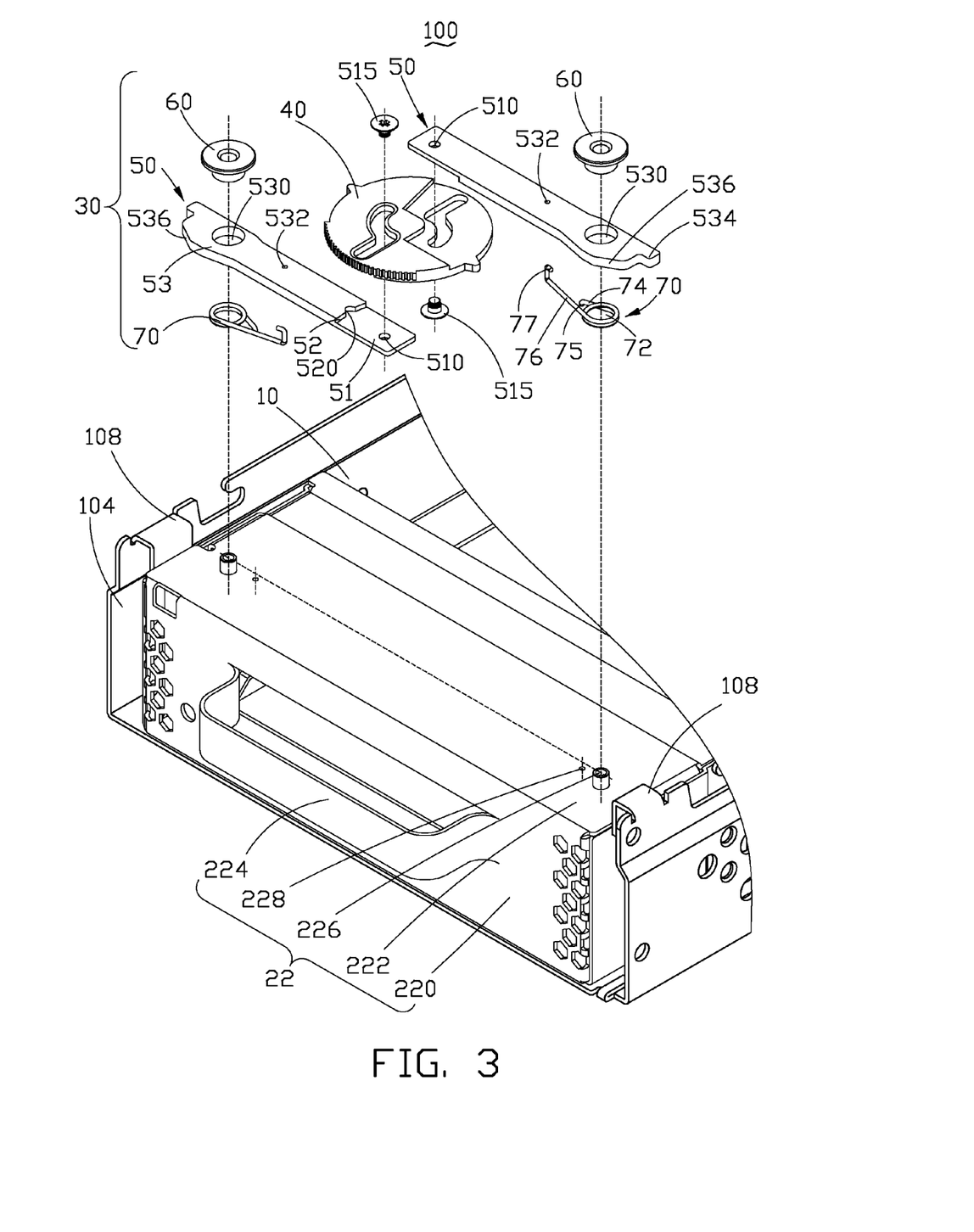
FIG. 3 is a disassembled perspective view of the exemplary embodiment of the electronic assembly in accordance with the present disclosure.

Referring to FIG. 2 and FIG. 3, the electronic device 20 is substantially a box-shaped structure to be received in the receiving space 106 of the housing structure 10 and comprises a main body 22. The main body 22 comprises a front panel 220 and a top side 222 perpendicular to the front panel 220. In the embodiment, the front panel 220 is perpendicular to the bottom wall 102 and the pair of side walls 104. The top side 222 is in parallel with the bottom wall 102 and used to secure the locking mechanism 30. The front panel 220 comprises a handle portion 224 to allow a user to pull the electronic device 20 out from the housing structure 10. In the illustrated embodiment, the handle portion 224 protrudes outwardly from and is integrally formed with the front panel 220. In the other embodiment, the handle portion 224 may be flexibly mounted on the front panel 220 and received in the electronic device 20.

Figure 4:
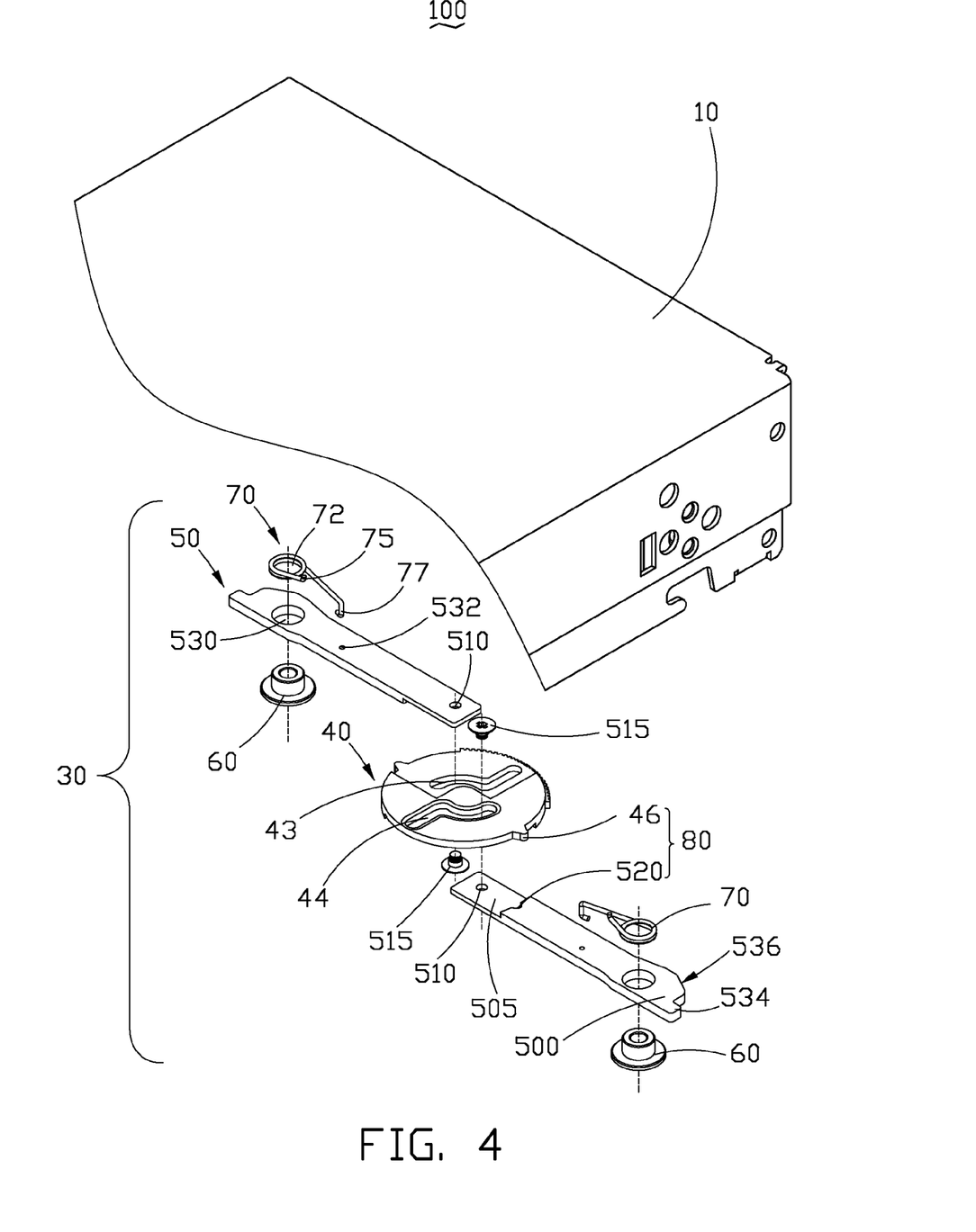
FIG. 4 is a disassembled perspective view in another direction of the exemplary embodiment of the electronic assembly in accordance with the present disclosure.

Referring to FIG. 3 and FIG. 4, the locking mechanism 30 comprises a pair of bar members 50, a pair of elastic elements 70 and an operating member 40. Each of the pair of the bar members 50 comprises a first end 500 and a second end 505 opposite to the first end 500. The first end 500 of each of the pair of bar members 50 comprises a blocking portion 534, and the second 505 end of corresponding bar member 50 is movably mounted to the operating member 40 by a matching portion 515. The blocking portion 534 engages with the corresponding resisting portion 108 to lock the electronic device 20 in the housing structure 10. The operating member 40 is disposed between and movably connected to the pair of bar members 50, and each of the pair of bar member 50 is disposed between the corresponding side wall 104 and the operating member 40. Each of the pair of elastic elements 70 is elastically connected between the electronic device 20 and the corresponding bar member 50 to provide elasticity to the corresponding bar member 50.

Referring also to FIG. 3, each of the pair of bar members 50 comprises a guiding segment 51, a ladder portion 52 and a linking segment 53. The guiding segment 51 engages with the operating member 40 by means of the matching portion 515. The linking segment 53 pivotedly connects to the electronic device 20 and resists the resisting portion 108 by the blocking portion 534 structured at the first end 500 of the linking segment 53. The ladder portion 52 is configured and structured between the guiding segment 51 and the linking segment 53 by a thickness of the guiding segment 51 being less than that of the linking segment 53, and matches with edges of the operating member 40 to secure the operating member 40. In the illustrated embodiment, a length of the guiding segment 51 is slightly shorter than that of the linking segment 53. In the illustrated embodiment, the guiding segment 51 is integrally formed with the linking segment 53.

In the illustrated embodiment, each of the pair of the bar members 50 defines a second hole 510 in the guiding segment 51, each of the matching portions 515 passes through a groove 43 or 44 (shown in FIG. 4) in the operating member 40 and is screwed into one of the second holes 510, so that the operating member 40 is movably mounted between the pair of bar members 50. In the other embodiment, the matching portions 515 integrally protrude outwardly from the guiding segments 51 and match with the grooves 43 and 44 in the operating member 40 so as to movably mount the operating member 40 between the pair of bar members 50.

The blocking portion 534 protrudes outwardly from the first end 500 of the linking segment 53 towards the corresponding side wall 104 to resist the resisting portion 108. The linking segment 53 has a slanting surface 536 neighboring the blocking portion 534 to engage with the resisting portion 108.

The top side 222 comprises a pair of positioning columns 226 to install the pair of bar members 50. Each of the pair of the positioning columns 226 protrudes outwardly from the top side 220 and is contiguous with the corresponding resisting portion 108. The linking segment 53 defines a third hole 530 contiguous with the blocking portion 534 and away from the ladder portion 52. Each of the pair of bar members 50 pivots on the corresponding positioning column 226 by the third hole 530 received the positioning column 226. In the illustrated embodiment, the pair of bar members 50 is rotatably mounted on the electronic device 20 by using the pair of positioning columns 226 as rotating shafts.

The pair of elastic elements 70 is fixed to the electronic device 20 and elastically connected between the electronic device 20 and the corresponding bar members 50, respectively. The main body 22 defines a pair of first holes 228 between and respectively closed to the pair of positioning columns 226. Correspondingly, the linking segment 53 defines a fourth hole 532 between the third hole 530 and the ladder portion 52. Each of the pair of the elastic elements 70 coils around the corresponding positioning column 226 with one end securely fixed in the fourth hole 532 to engage with the bar member 50 and the other end securely fixed in the first hole 228 to engage with the electronic device 20.

In the illustrated embodiment, each of the pair of elastic elements 70 is a torsion spring. Each of the pair of elastic elements 70 comprises a first section 74 and a second section 76 integrally formed with each other, and defines an elastic hole 72 by encircled the first section 74 and the second section 76. The first section 74 comprises a first latching hook 75 on a free end of the elastic element 70, and the second section 76 comprises a second latching hook 77 on another free end of the elastic element 70. The positioning column 226 passes through the corresponding elastic hole 72 to position the elastic element 70. The first latching hook 75 is formed by bending the free end of the elastic element 70 and the second latching hook 77 is formed by bending another free end of the elastic element 70. In the illustrated embodiment, the first latching hook 75 and the second latching hook 77 are bent towards two opposite directions and are both in "U", "J" or "C" shape. In the illustrated embodiment, a length of the first section 74 is slightly shorter than that of the second section 76. The first latching hook 75 is inserted in the first hole 228 to securely engage with the main body 22, and the second latching hook 77 is inserted in the fourth hole 532 to securely engage with the corresponding bar member 50. In this way, each of the pair of elastic elements 70 provides a restoring force to the corresponding bar member 50 as the main body 20 is fixed relatively.

The locking mechanism 30 further comprises a pair of fastening pieces 60, such as screws or bolts. In the illustrated embodiment, the pair of fastening pieces 60 matches with the corresponding positioning columns 226 to limit the bar members 50 and the elastic elements 70 move along axes of the corresponding positioning columns 226 in assembly.

Figure 5:
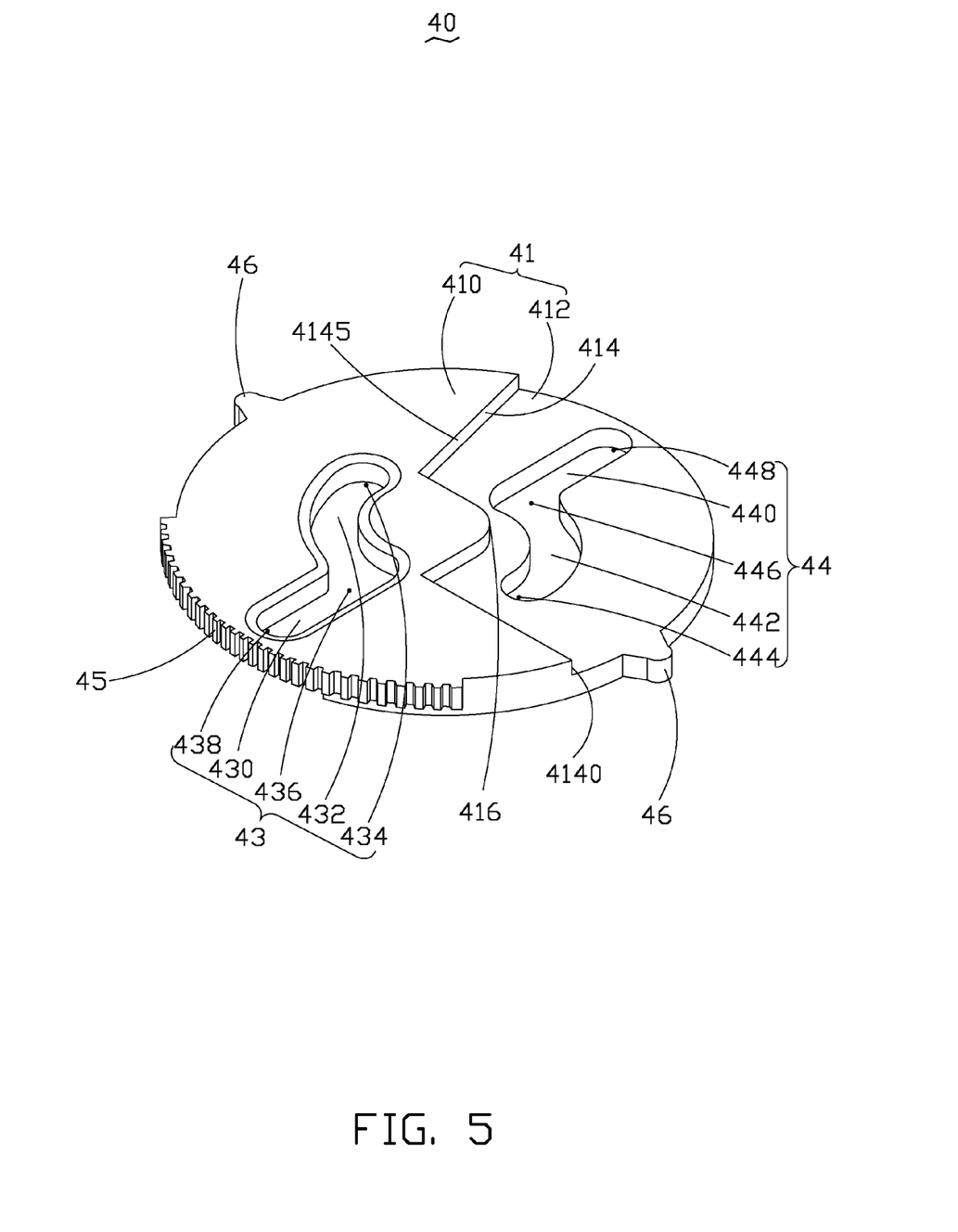
FIG. 5 is a perspective view of the exemplary embodiment showing a positive surface of an operating member in accordance with the present disclosure.
Figure 6:
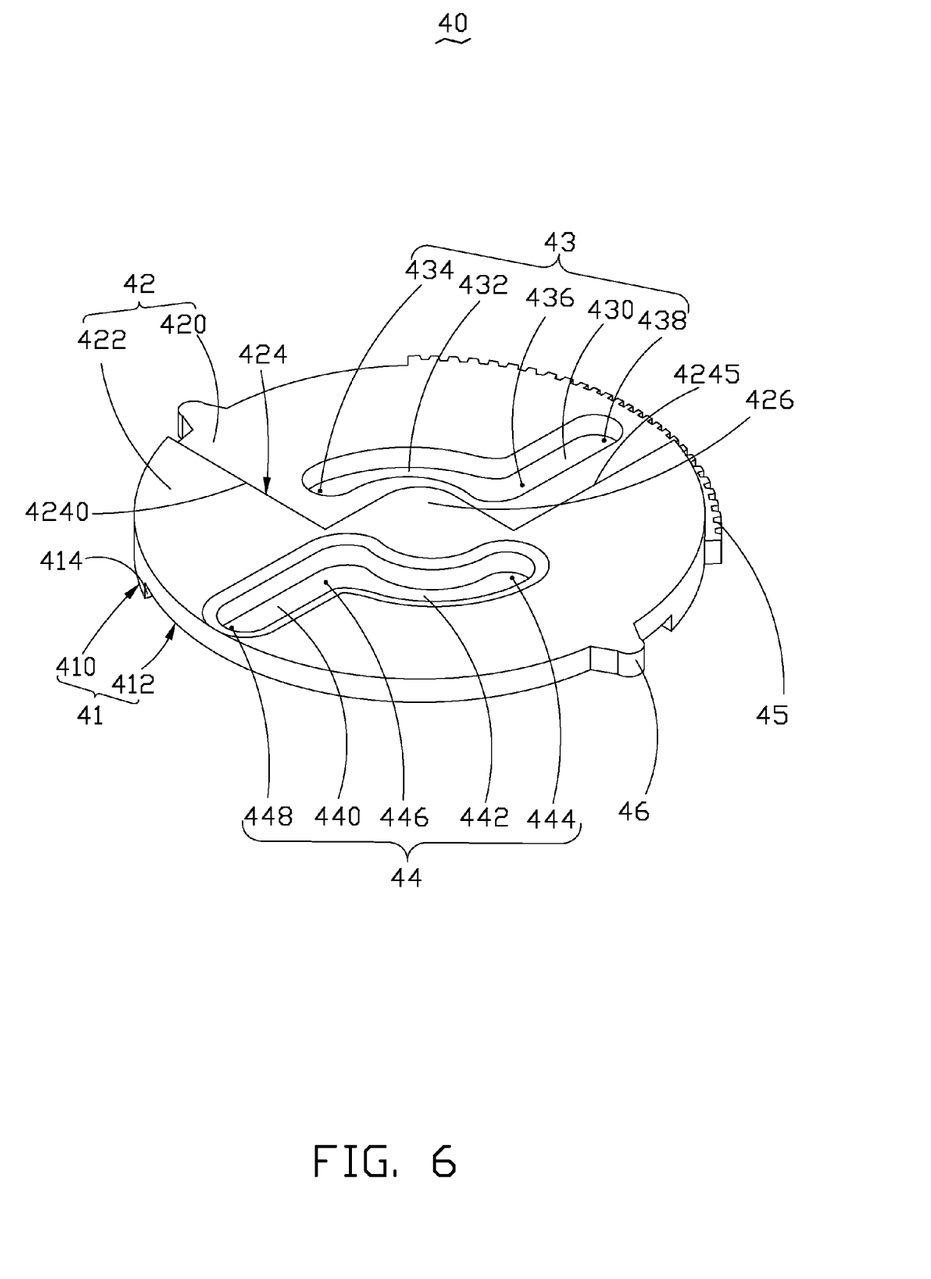
FIG. 6 is a perspective view of the exemplary embodiment showing a negative surface of the operating member in accordance with the present disclosure.

Referring to FIG. 5 and FIG. 6, the operating member 40 comprises a first surface 41 and a second surface 42 opposite to the first surface 41. In the illustrated embodiment, the operating member 40 is substantially in a disk-shape. The first surface 41 comprises a first positive surface 410 and a first negative surface 412, and the second surface 42 comprises a second negative surface 420 opposite to the first positive surface 410 and a second positive surface 422 opposite to the first negative surface 412. The operating member 40 comprises a first step 414, a first projecting portion 416, a second step 424 and a second projecting portion 426. The first step 414 and the first projecting portion 416 are structured between the first positive surface 410 and the first negative surface 412, the second step 424 and the second projecting portion 426 are structured between the second negative surface 420 and the second positive surface 422. The first negative surface 412 and the first positive surface 410 are configured in different planes so as to form the first step 414, and the second positive surface 422 and the second negative surface 420 are configured in different planes so as to form the second step 424. In the illustrated embodiment, the first positive surface 410 and the second positive surface 422 are substantially shaped as sectors with the same angles to provide movement areas for the pair of bar members 50. The first step 414 comprises a first locking side 4140 and a first unlocking side 4145, and the second step 424 comprises a second locking side 4240 and a second unlocking side 4245, to respectively engage with the pair of bar members 50. The first projecting portion 416 is structured between the first locking side 4140 and the first unlocking side 4145. Similarly, the second projecting portion 426 is structured between the second locking side 4242 and the second unlocking side 4245. The first step 414 and the first projecting portion 416 cooperatively form a W-shape or M-shape, and the second step 424 and the second projecting portion 426 cooperatively form a W-shape or M-shape. The first step 414, the second step 424, the first projecting portion 416 and the second projecting portion 426 engage with the guiding segment 51 to position the corresponding bar member 50.

The operating member 40 is located between the pair of the bar members 50 and defines a first groove 43 and a second groove 44 engaging with the matching portions 515, respectively. The first groove 43 passes through the operating member 40 from the first positive surface 410 to the second negative surface 420, and the second groove 44 passes through the operating member 40 from the first negative surface 412 to the second positive surface 422. The first groove 43 comprises a first straight groove 430 and a first guiding groove 432 communicating with each other, and the second groove 44 comprises a second straight groove 440 and a second guiding groove 442 communicating with each other. The first straight groove 430 and the second straight groove 440 are defined along a same diameter line of the operating member 40. The second straight groove 440 is contiguous with the first unlocking side 4145, and the first straight groove 430 is contiguous with the second unlocking side 4245. The first guiding groove 432 and the second guiding groove 442 are two opposite hollow arcs on a common circle about center of the operating member 40. In the illustrated embodiment, the first guiding groove 432 extends from the first straight groove 430 towards the second locking side 4240 around the second projecting portion 426, and the second guiding groove 442 is opposite to the first guiding groove 432 and extends from the second straight groove 440 towards the first locking side 4140 around the first projecting portion 416.

In the illustrated embodiment, the first guiding groove 432 is centrally symmetry with the second guiding groove 442 relatively to a center of the operating member 40. In detail, the first guiding groove 432 and the second guiding groove 442 are two arc grooves having the same radius and having a common center with the operating member 40.

The first groove 43 comprises a first locking point 434, a first pre-opening point 436 and a first unlocking point 438. The first locking point 434 is defined at one end of the first guiding groove 432 away from the first straight groove 430 and contiguous with the second locking side 4240. The first unlocking point 438 is defined at one end of the first straight groove 430 away from the first guiding groove 432 and is contiguous with the second unlocking side 4245. The first pre-opening point 436 is defined at a junction of the first straight groove 430 and the first guiding groove 432.

Similarly, the second groove 44 comprises a second locking point 444, a second pre-opening point 446 and a second unlocking point 448 respectively corresponding to the first locking point 434, the first pre-opening point 436 and the first unlocking point 438. The second locking point 444 is defined at one end of the second guiding groove 442 away from the second straight groove 440 and contiguous with the first locking side 4140. The second unlocking point 448 is defined at one end of the second straight groove 440 away from the second guiding groove 442 and contiguous with the first unlocking side 4145. The second pre-opening point 446 is defined at a junction of the second straight groove 440 and the second guiding groove 442.

The operating member 40 further comprises a force applying portion 45. In the illustrated embodiment, the force applying portion 45 is substantially in a saw tooth shape. The force applying portion 45 symmetrically distributes along a centre line of the first straight groove 430 and the second straight groove 440. In assembly, the force applying portion 45 protrudes out from the front panel 220 for user's convenient operation. The operating member 40 can be rotated by applying force towards the force applying portion 45.

In the illustrated embodiment, the locking mechanism 30 further comprises a pair of buckling units 80 between the pair of bar member 50 and the operating member 40. The pair of buckling units 80 limits the operating member 40 from rotating when the pair of bar member 50 locks the electronic device 20.

Each of the pair of buckling units 80 comprises a recess portion 520 defined in the bar member 50 opposite to the operating member 40 and a nipple portion 46 protruding outwardly from the operating member 40 to the bar member 50. The recess portion 520 engages with the nipple portion 46 to prevent the operating member 40 from rotating. The recess portion 520 is configured in the ladder portion 52 of the bar member 50. In the illustrated embodiment, the recess portion 520 is substantially in C-shape. In the illustrated embodiment, centers of the third hole 530, the fourth hole 432, the recess portion 520 and the second hole 510 are configured on a same line. In other embodiment, centers of the positioning column 226, the recess portion 520 and the matching portion 515 are configured on a same line.

In the illustrated embodiment, the pair of nipple portions 46 is symmetrically protruded outwardly from the operating member 40 to resist the corresponding recess portions 520. In the illustrated embodiment, the nipple portion 46 is substantially in C-shape. One of the pair of nipple portions 46 is contiguous with the first locking point 434 and the second locking side 4240, another one is contiguous with the second locking point 444 and the first locking side 4140. In the illustrated embodiment, the pair of nipple portions 46, the first locking point 434 and the second locking point 444 are on a same line. The positioning column 226, the buckling unit 80 and the matching portion 515 are on a same line to further lock the electronic device 20.

In other embodiment, the pair of recess portions 520 of the buckling unit 80 is symmetrically defined on the operating member 40 and the nipple portion 46 protrudes outwardly from the ladder portion 52 towards the guiding segment 51. In this case, the pair of bar members 50 can be locked with the operating member 40 by engaging the recess portion 520 with the nipple portion 46 in order to prevent the operating member 40 from rotating by mistake. In other embodiment, the pair of bar member 50 could be locked on the operating member 40 by other securing methods, such as by engaging a hook with a groove.

In the illustrated embodiment, the force applying portion 45 and the pair of nipple portions 46 are integrally formed with the operating member 40. The operating member 40 is made of plastic material so that the pair of nipple portions 46 can be elastically distorted to disengage from the corresponding recess portions 520.

Installation of the electronic assembly 100 would be described as below.

Firstly, the guiding segments 51 are opposite to each other to fit around the operating member 40, and placed on the first negative surface 412 and the second negative surface 420, respectively. The matching portions 515 pass through the first groove 43 and the second groove 44 to movably connect the pair of bar members 50 with operating member 40, respectively, so as to adjust the relative position of the pair of bar members 50 and the operating member 40. For example, in order to adjust the matching portions 515 to the first locking point 434 and the second locking point 444, sides of the corresponding guiding segments 51 are turned to resist with the first locking side 4140 of the first step 414 and with the second locking side 4240 of the second step 424, respectively, and ends of guiding segments 51 resist on the first projecting portion 416 and the second projecting portion 426. Therefore, the operating member 40 is mounted between the guiding segments 51.

Secondly, the operating member 40 and the pair of bar members 50 are placed over the top side 222. The elastic hole 72 is coiled around the positioning column 226, and the first latching hook 75 and the second latching hook 77 are securely inserted in the first hole 228 and the fourth hole 532, respectively. Thus, the elastic element 70 is elastically connected between the main body 22 and the corresponding bar member 50.

Thirdly, each of the pair of bar members 50 pivots on the positioning column 26 through the third hole 530. The fastening piece 60 is securely fastened on the positioning column 226 to limit the corresponding bar member 50 and the elastic element 70. Therefore, the locking mechanism 30 is mounted on the electronic device 20.

Finally, the electronic device 20 is received in the receiving space 106 of the housing structure 10, and the top side 222 is opposite to and far away from the bottom wall 102. The blocking portions 534 resist the corresponding resisting portions 108 to securely mount the electronic device 20 in the housing structure 10. To further lock the electronic device 20, the pair of bar members 50 holds the operating member 40 by engaging the nipple portions 46 of the buckling unit 80 with the corresponding recess portions 520. By doing this, the electronic device 20 is locked in the housing structure 10 via the locking mechanism 30.

A locking process and an unlocking process of the electronic device 20 will be described as below.

Referring to FIG. 2, when the electronic device 20 is completely received in the housing structure 10, the pair of elastic elements 70 is compressed, the blocking portions 534 resist the resisting portions 108, and the matching portions 515 are located at the first locking point 434 and the second locking point 444, respectively. In this state, the electronic device 20 is securely locked in the housing structure 10 by engaging the pair of bar members 50 with the operating member 40.

In detail, the electronic device 20 is completely received in the receiving space 106. Each of the pair of elastic elements 70 is compressed while each of the pair of elastic elements 70 elastically connects between the corresponding bar member 50 and the electronic device 20. Each of the pair of the bar members 50 pivots on the positioning column 226 and the operating member 40 is held between the pair of guiding segments 51 to expose the force applying portion 45 directly over the handle portion 224. Sides of the guiding segments 51 respectively resist on the first locking side 4140 of the first step 414 and the second locking side 4240 of the second step 424, and the ends of guiding segments 51 respectively resist on the first projecting portion 416 and the second projecting portion 426. The pair of matching portions 515 are respectively received in the first guiding groove 432 and the second guiding groove 442 and located at the first locking point 434 and the second locking point 444. The blocking portions 534 resist the corresponding resisting portions 108 to fix the corresponding bar members 50 between the operating member 40 and the housing structure 10. That is, the electronic device 20 is locked in the housing structure 10 by the locking mechanism 30, and this state of the electronic device 20 is defined as a locking state or an original state.

To further lock the electronic device 20, the nipple portion 46 engages with the recess portion 520 to make the pair of bar members 50 stand on a same line. Thus, the positioning columns 226, the pair of buckling units 80 and the matching portions 515 are on a same line. In a word, when the blocking portions 534 resist the resisting portions 108, the matching portions 515 respectively locate at the first locking point 434 and the second locking point 444, and the nipple portions 46 engage with the recess portions 520, this state of the electronic device 20 is also defined as the locking state or the original state.

When the electronic device 20 is at the locking state and there is no force applied on the operating member 40, and the first guiding groove 432 and the second guiding groove 442 fail to provide a rotating space for the matching portions 515 to rotate along a rotating direction A' (shown in FIG. 7), each of the pair of bar members 50 is functioned by both the corresponding resisting portion 108 and the corresponding elastic element 70, and the matching portions 515 respectively dispose at the first locking point 434 and the second locking point 44. In this case, the electronic device 20 is locked in the housing structure 10 by the locking mechanism 30, as shown in FIG. 2.

Figure 7:
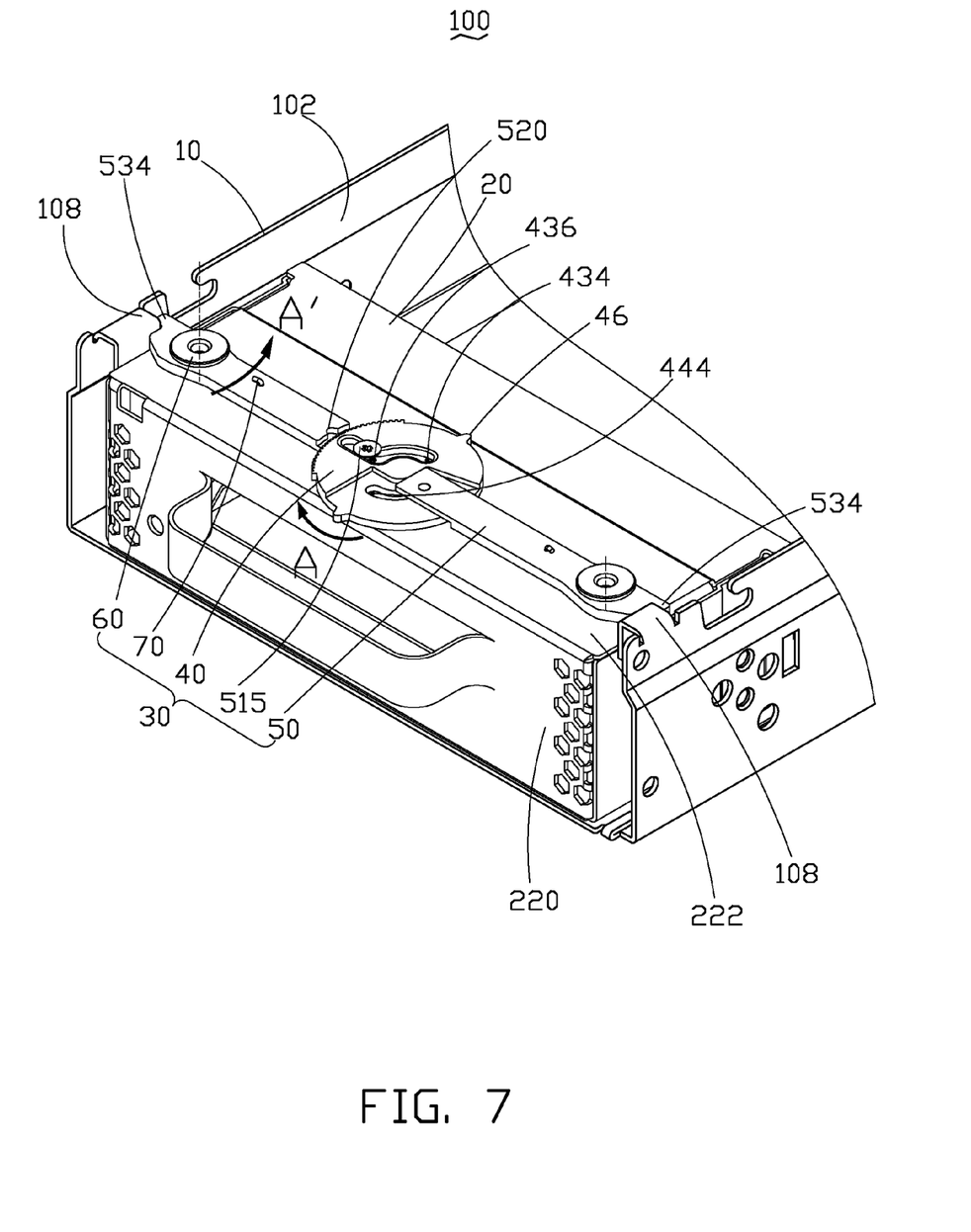
FIG. 7 is a perspective view of the exemplary embodiment of the electronic assembly when rotating the operating member in accordance with the present disclosure.

Referring to FIG. 7, the matching portions 515 respectively locate at the first pre-opening point 436 and the second pre-opening point 446 by rotating the operating member 40. The details will be described as below.

In order to disengage the nipple portions 46 from the corresponding recess portions 520 when the electronic device 20 at the locking state as shown in FIG. 2, the operating member 40 rotates along a rotating direction A by applying a force to the force applying portion 45 as shown in FIG. 7. If the force is big enough to make the nipple portions 46 distort and disengage from the corresponding recess portions 520, the first groove 43 and the second groove 44 relatively rotate with the operating member 40, and the pair of bar members 50 is at rest. At this moment, the blocking portions 534 still resist the resisting portions 108, the matching portions 515 respectively move from the first locking point 434 to the first pre-opening point 436 and from the second locking point 444 to the second pre-opening point 446, and the guiding segments 51 turn to resist on the first projecting portion 416 near the first unlocking side 4145 and the second projecting portion 426 near the second unlocking side 4245, respectively.

Figure 8:
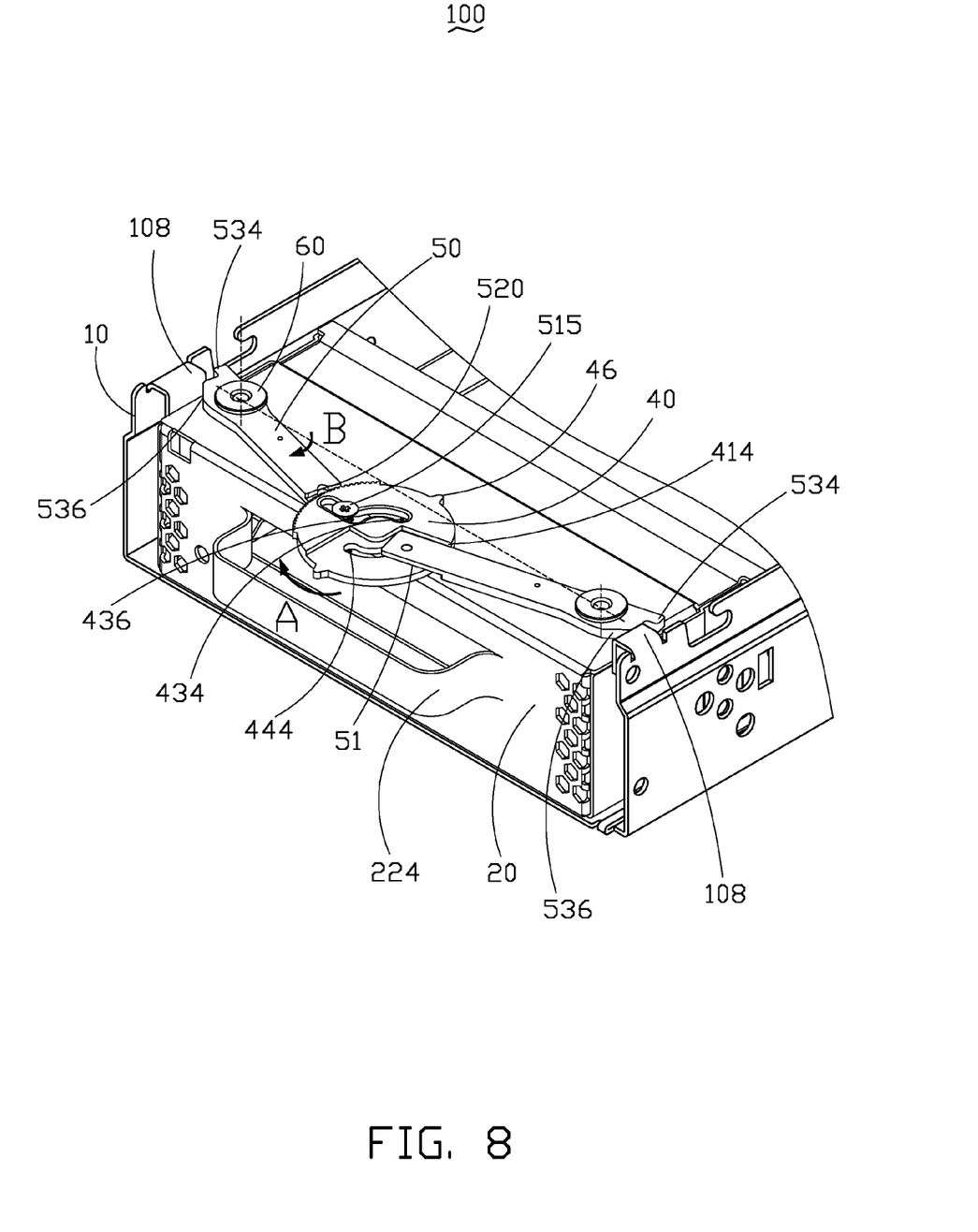
FIG. 8 is a perspective view of the exemplary embodiment of the electronic assembly when the electronic device in a pre-opening state in accordance with the present disclosure.
Figure 9:
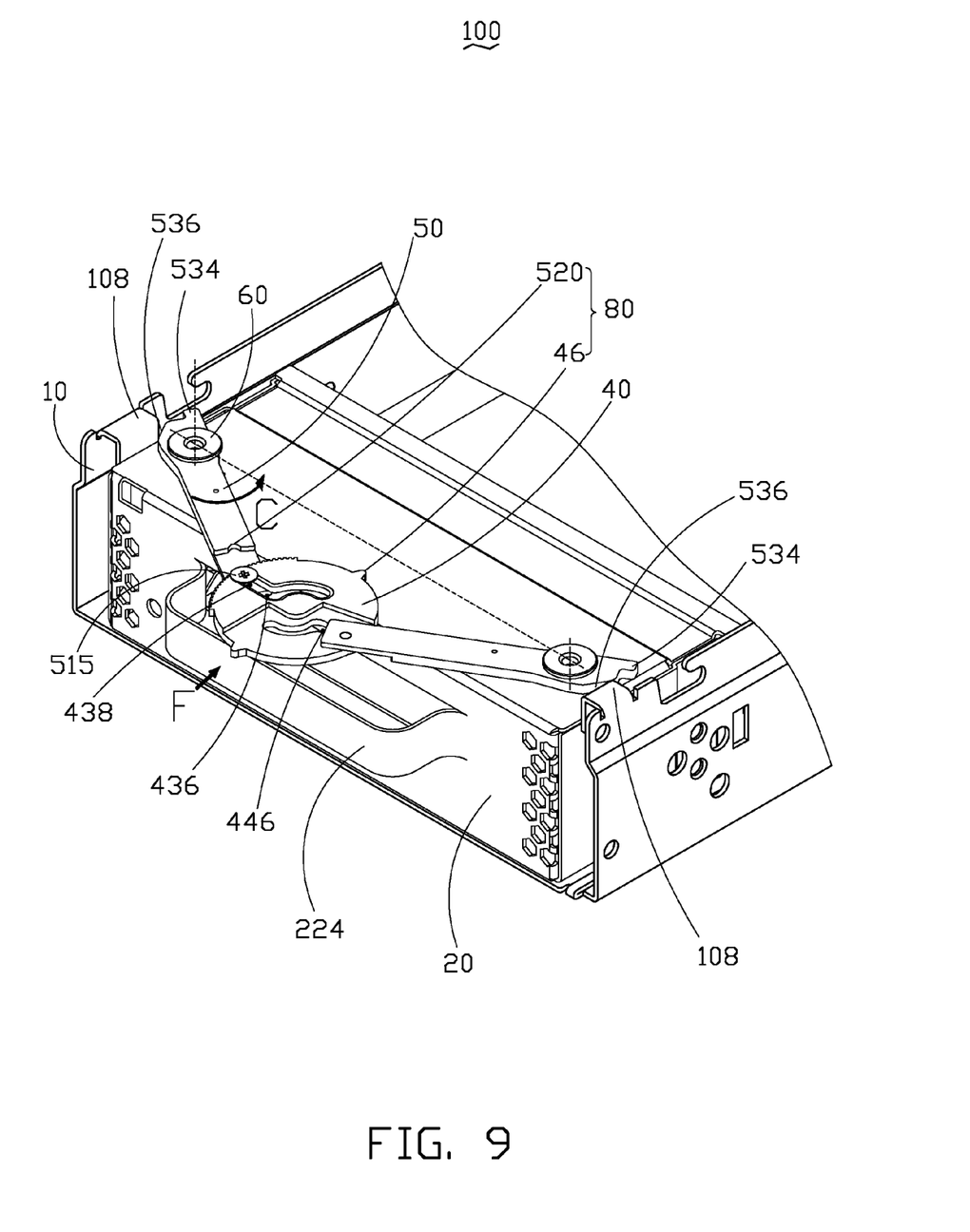
FIG. 9 is a perspective view of the exemplary embodiment of the electronic assembly when the electronic device in an unlocking state in accordance with the present disclosure.

Referring to FIG. 8 and FIG. 9, under the restoring force functioned by the pair of elastic elements 70, the pair of bar members 50 rotates around the corresponding positioning column 226. The matching portions 515 respectively move from the first pre-opening point 436 to the first unlocking point 438 along the first straight groove 430 and from the second pre-opening point 446 to the second unlocking point 448 along the second straight groove 440. The blocking portions 534 disengage from the corresponding resisting portions 108. Therefore, the electronic device 20 can be easily taken out from the housing structure 10. The details will be described as below.

The matching portions 515 trend to move in the first straight groove 430 away from the first pre-opening point 436 and in the second straight groove 440 away from the second pre-opening point 446, respectively. The pair of bar members 50 rotates around the corresponding positioning columns 226 in a rotating direction B under the restoring force of the pair of elastic elements 70, so as to drive the matching portions 515 moving from the first pre-opening point 436 towards the first unlocking point 438 and from the second pre-opening point 446 towards the second unlocking point 448, and to propel the operating member 40 straightly moving towards a pulling direction of the handle portion 224. The pair of bar members 50 respectively moves towards the first unlocking side 4145 and the second unlocking side 4245, and ends of the guiding segments 51 respectively move away from the first projecting portion 416 and the second projecting portion 426. The blocking portions 534 gradually disengage from the corresponding resisting portions 108. In this process, the electronic device 20 is in the pre-opening state, as shown in FIG. 8.

Under the continual restoring force of the pair of elastic elements 70, the pair of bar members 50 continually rotates around the corresponding positioning columns 226 on the rotating direction B (shown in FIG. 8), and the blocking portions 534 completely disengage from the corresponding resisting portions 108. The resisting portions 108 engage with the corresponding slanting surfaces 536 to be far away from the pair of bar members 50. The matching portions 515 respectively move to the first unlocking point 438 and the second unlocking point 448, the operating member 40 straightly moves towards the pulling direction of the handle portion 224, and sides of the pair of bar members 50 disengage from the first step 414 and the second step 424, until the pair of elastic elements 70 are on a natural state and an angle between the pair of the bar members 50 reaches a minimum angle. In a word, under the restoring force of the pair of elastic elements 70, the pair of bar members 50 rotates around the rotating direction B, the matching portions 515 respectively move to the first unlocking point 438 and the second unlocking point 448, and the blocking portions 534 disengage from the corresponding resisting portions 108. This state of the electronic device 20 is defined as unlocking state. The electronic device 20 is taken out from the housing structure 10 by pulling the handle portion 224 at the unlocking state, as shown in FIG. 9. By doing this, the electronic device 20 can be easy taken out from the housing structure 10 just by pulling the handle portion 224.

Referring to FIG. 9, the pair of bar members 50 rotates around the corresponding positioning column 226 on a rotating direction C by applying an acting force F on the operating member 40. The matching portions 515 move from the first unlocking point 438 towards the first pre-opening point 436 and from the second unlocking point 448 towards the second pre-opening point 446, respectively. The operating member 40 straightly moves along direction of the acting force F. At this moment, the locking mechanism 30 trends to be locked. Until the matching portions 515 move to the first pre-opening point 436 and the second pre-opening point 446 and the blocking portions 534 resist on the corresponding resisting portions 108, the electronic device 20 is mounted in the housing structure 10 via the locking mechanism 30, as shown in FIG. 8. The matching portions 515 move from the first pre-opening point 436 to the first locking point 434 along the first guiding groove 432 and from the second pre-opening point 446 to the second locking point 444 along the second guiding groove 442 by rotating the operating member 40 along a opposite direction of the rotating direction A. Therefore, the electronic device 20 is at the locking state, as shown in FIG. 7.

The nipple portions 46 engage with the corresponding recess portions 520, and the pair of fastening pieces 60, the recess portions 520, the nipple portions 46 and the matching portions 515 are on the same line, so as to further locking the electronic device 20. That is, the electronic device 20 is completely locked in the housing structure 10 by the locking mechanism 30, as shown in FIG. 2.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A locking mechanism, operable to lock a removable electronic device in a housing structure comprising a pair of resisting portions, the locking mechanism comprising:
an operating member defining a first groove and a second groove;
a pair of positioning columns, each of the positioning columns being contiguous with a corresponding one of the resisting portions;
a pair of bar members, with the operating member located between the bar members, each of the bar members comprising a blocking portion to engage with a corresponding one of the resisting portions, a matching portion, a guiding segment, a ladder portion, and a linking segment, the guiding segment being engaged with the operating member by engagement of the matching portion and a corresponding one of the first and second grooves, the linking segment defining a third hole contiguous with the blocking portion, the linking segment pivoted on a corresponding one of the positioning columns by the third hole receiving the corresponding positioning column and engaging the resisting portion by the blocking portion structured at an end of the linking segment, and the ladder portion being configured and structured between the guiding segment and the linking segment to secure the operating member when the blocking portion is engaged with the resisting portion; and
a pair of elastic elements, each of the elastic elements fixed to the electronic device and elastically connected between the electronic device and a corresponding one of the bar members;
wherein when the operating member is rotated, the guiding segments slide along the first groove and the second groove, respectively, and subsequent movement of bar members under a biasing force of the elastic elements, disengages the blocking portions from the resisting portions.

2. The locking mechanism as claimed in claim 1, wherein the first groove comprises a first straight groove portion and a first guiding groove portion communicating with each other, the second groove comprises a second straight groove portion and a second guiding groove portion communicating with each other, the first straight groove portion and the second straight groove portion are defined extend along a same diameter line of the operating member to a center of the operating member, the first guiding groove portion and the second guiding groove portion are two opposite hollow arcs on a common circle about the center of the operating member.

3. The locking mechanism as claimed in claim 1, wherein each of the elastic elements is a torsion spring, each torsion spring comprises a first section and a second section integrally formed with each other, and defines an elastic hole by encircled the first section and the second section, a corresponding one of the positioning columns passes through the elastic hole to position a corresponding one of the elastic elements.

4. The locking mechanism as claimed in claim 3, wherein the first section comprises a first latching hook on a free end of each elastic element and the second section comprises a second latching hook on another free end of each elastic element, the first latching hook is formed by bending the free end of each elastic element and the second latching hook is formed by bending another free end of each elastic element, the electronic device defines a pair of first holes and each linking segment defines a fourth hole, each first latching hook is inserted in a corresponding one of the first holes to securely engage with the electronic device and each second latching hook is inserted in a corresponding one of the fourth holes to securely engage with a corresponding one of bar members.

5. The locking mechanism as claimed in claim 1, wherein the operating member comprises a first surface and a second surface opposite to the first surface, the first surface comprises a first positive surface and a first negative surface, and the second surface comprises a second negative surface opposite to the first positive surface and a second positive surface opposite to the first negative surface.

6. The locking mechanism as claimed in claim 5, wherein the first groove passes through the operating member from the first positive surface to the second negative surface, and the second groove passes through the operating member from the first negative surface to the second positive surface.

7. The locking mechanism as claimed in claim 5, wherein the operating member comprises a first step structured between the first positive surface and the first negative surface and a second step structured between the second negative surface and the second positive surface, the first step comprises a first locking side and a first unlocking side, and the second step comprises a second locking side and a second unlocking side, to respectively engage with each of the bar members.

8. The locking mechanism as claimed in claim 7, wherein the operating member comprises a first projecting portion and a second projecting portion to engage with each of the bar members, respectively, the first projecting portion is structured between the first locking side and the first unlocking side, the second projecting portion is structured between the second locking side and the second unlocking side.

9. The locking mechanism as claimed in claim 2, wherein the operating member comprises a force applying portion symmetrically distributed along a center line of the first straight groove portion and the second straight groove portion for a user's convenient operation, and the force applying portion is distributed along a sidewall of the operating member.

10. The locking mechanism as claimed in claim 2, wherein the pair of bar members rotate relative to one another on the electronic device under a restoring force of the pair of elastic elements, the matching portions respectively move along the first straight groove portion away from the first guiding groove portion and along the second straight groove portion away from the second guiding groove portion until the blocking portions disengage with from the resisting portions.

11. A locking mechanism, operable to lock a removable electronic device in a housing structure comprising a pair of resisting portions, the locking mechanism comprising:
 a pair of bar members, each of the bar members comprising a blocking portion to engage with a corresponding one of the resisting portions and a matching portion;
 an operating member, located between the pair of bar members, and defining a first groove and a second groove engaging with the matching portions, respectively;
 a pair of buckling units limiting the operating member from rotating, each of the buckling units comprising a recess portion defined in a corresponding one of the bar members opposite to the operating member and a nipple portion protruding outwardly from the operating member, the recess portion being engaged with the nipple portion to prevent the operating member from rotating until a predetermined force is applied to the operating member;
 wherein when the predetermined force is applied to the operating member to disengage the nipple portions from the recess portions, the operating member is rotated, and the matching portions slide in the first groove the second groove, respectively, to disengage the blocking portions from the resisting portions.

12. The locking mechanism as claimed in claim 11, wherein the locking mechanism further comprises a pair of elastic elements, each of the elastic elements is fixed to the electronic device and elastically connected between the electronic device and a corresponding one of the bar members.

13. The locking mechanism as claimed in claim 12, wherein each of the elastic elements is a torsion spring, each torsion spring comprises a first section and a second section integrally formed with each other, and defines an elastic hole by encircled the first section and the second section, wherein a corresponding positioning column passes through the elastic hole to position a corresponding one of the elastic elements.

14. The locking mechanism as claimed in claim 12, wherein the first groove comprises a first straight groove portion and a first guiding groove portion communicating with each other, the second groove comprises a second straight groove portion and a second guiding groove portion communicating with each other; the first straight groove portion and the second straight groove portion extend along a same diameter line of the operating member to a center of the operating member, the first guiding groove portion and the second guiding groove portion are two opposite hollow arcs on a common circle about the center of the operating member; the pair of bar members rotate relative to one another on the electronic device under a restoring force of the pair of elastic elements, the matching portions respectively move along the first straight groove portion away from the first guiding groove portion and along the second straight groove portion away from the second guiding groove portion until the blocking portions disengage from the resisting portions.

15. A locking mechanism, operable to lock a removable electronic device in a housing structure comprising a pair of resisting portions, the locking mechanism comprising:
 a pair of bar members, each of the bar members comprising a blocking portion to engage with a corresponding one of the resisting portions and a matching portion;
 an operating member, located between the pair of bar members, and defining a first groove and a second groove engaging with the matching portions, respectively, the first groove comprising a first straight groove portion and a first guiding groove portion communicating with each other, the second groove comprising a second straight groove portion and a second guiding groove portion communicating with each other, wherein the first straight groove portion and the second straight groove portion extend along the same diameter line of the operating member to a center of the operating member, the first guiding groove portion and the second guiding groove portion are two opposite hollow arcs on a common circle about the center of the operating member;
 wherein each of the bar members comprises a guiding segment, a ladder portion, and a linking segment; the guiding segment engages with the operating member by means of the matching portion, the linking segment is pivotedly connected to the electronic device and engages the resisting portion by the blocking portion structured at an end of the linking segment, and the ladder portion is configured and structured between the guiding segment and the linking segment to secure the operating member when the blocking portion is engaged with the resisting portion.

16. The locking mechanism as claimed in claim 15, wherein the electronic device comprises a pair of positioning columns, each of the positioning columns being contiguous with a corresponding one of the resisting portions to install the bar members, each of the linking segments defines a third hole contiguous with the blocking portion, each of the bar members is pivoted on a corresponding one of the positioning columns by the third hole received the corresponding positioning column.

17. The locking mechanism as claimed in claim 15, wherein the electronic device further comprises a pair of buckling units, each of the buckling units comprises a recess portion defined in a corresponding one of bar members opposite to the operating member and a nipple portion protruding outwardly from the operating member, the recess portion engages with the nipple portion to prevent the operating member from rotating.

18. The locking mechanism as claimed in claim 15, wherein the locking mechanism further comprises a pair of elastic elements, each of the elastic elements is fixed to the electronic device and elastically connected between the electronic device and a corresponding one of the bar members.

19. The locking mechanism as claimed in claim 17, wherein the pair of bar members rotate relative to one another on the electronic device under a restoring force of the pair of elastic elements, the matching portions respectively move along the first straight groove portion away from the first guiding groove portion and along the second straight groove portion away from the second guiding groove portion until the blocking portions disengage from the resisting portions.

* * * * *